United States Patent [19]

Esibyan et al.

[11] 4,133,988
[45] Jan. 9, 1979

[54] METHOD OF PLASMA ARC CUTTING CONTROL AND A DEVICE FOR REALIZING SAME

[76] Inventors: Eduard M. Esibyan, ulitsa Kikvidze, 4, kv. 21; Mikhail E. Danchenko, ulitsa B.Likhacheva, 3, kv. 53; Vasily B. Malkin, prospekt Voroshilova, 31, kv. 305; Vsevolod D. Dotsenko, ulitsa Miljutenko, 28a, kv. 33; Grigory B. Asoyants, bulvar L.Ukrainki, 2, kv. 16, all of Kiev, U.S.S.R.

[21] Appl. No.: 664,432

[22] Filed: Mar. 8, 1976

[30] Foreign Application Priority Data

Mar. 12, 1975 [SU] U.S.S.R. .............................. 2109052
Oct. 30, 1975 [SU] U.S.S.R. .............................. 2182702

[51] Int. Cl.$^2$ ................................................. B23K 9/16
[52] U.S. Cl. ........................... 219/121 P; 219/130.01; 219/74
[58] Field of Search ........... 219/121 P, 121 R, 131 R, 219/132, 74, 75, 76; 313/231.3

[56] References Cited

U.S. PATENT DOCUMENTS

| 3,319,042 | 5/1967 | Thostrup et al. ................... 219/74 X |
| 3,471,674 | 10/1969 | Gage ............................ 219/74 |
| 3,581,051 | 5/1971 | Brown ............................ 219/132 X |
| 3,792,225 | 2/1974 | Needham ......................... 219/131 R |
| 3,811,027 | 5/1974 | Strahan .......................... 219/74 |
| 3,988,566 | 10/1976 | Vogts et al. ..................... 219/121 P |

FOREIGN PATENT DOCUMENTS

| 2158547 | 6/1973 | France ............................ 219/121 P |
| 1331139 | 1973 | United Kingdom ................ 219/121 P |
| 1380098 | 1/1975 | United Kingdom ................ 219/121 P |

*Primary Examiner*—J. V. Truhe
*Assistant Examiner*—M. Paschall
*Attorney, Agent, or Firm*—Lackenbach, Lilling & Siegel

[57] ABSTRACT

To control the plasma arc in accordance with the present invention, the pressure change characteristics or curve in a torch is determined from the moment a plasma forming gas is delivered thereto until this plasma forming gas reaches the pressure in the supply manifold. Such a measurement is done for each selected cutting condition characterized by a constant flow rate of the plasma forming gas. The arc supply current is then fed in two stages: at first by a jump to a current amounting to approximately half the cutting current for a selected condition and then by gradually increasing the current in compliance with the pressure change characteristics or curve until the cutting current value is attained. Also described is a device to realize the method, comprising a torch pressure sensor, a means for shutting off the torch nozzle, a memory unit registering the signals of the pressure sensor and a rectifier regulator control means which controls the regulator in accordance with the sensor signals recorded in the memory unit.

2 Claims, 3 Drawing Figures

METHOD OF PLASMA ARC CUTTING CONTROL AND A DEVICE FOR REALIZING SAME

This invention relates to plasma treatment and, in particular, to a method of plasma arc cutting control, and a device for realizing the method which can be most effectively employed for metal cutting.

It is well known that the quality of cutting depends on the stability of the plasma arc, which in turn depends primarily upon the stability of the pressure of the plasma forming gas in a torch. One of the known methods of plasma arc cutting involves cutting at a certain definite flow rate of a plasma forming gas which is constant for the selected cutting condition, said condition being selected depending on the thickness and type of the material, cutting speed, etc. The cutting arc supply current in this case is fed in two stages: at first by a jump to the current value amounting to almost half the cutting current value and then by gradually increasing the supply current to the cutting value, said value being dependent upon the selected cutting condition governed by the aforementioned reasons.

The rate of gradual increase of the arc current is of crucial importance for both the quality of cutting and its efficiency. If the current increase speed is slow, the cutting defect zone is increased since the current may be insufficient to cut through the metal. If the current increase speed is high, a double arc may form resulting in breakdown of the plasmotron. This means that arbitrary selection of a program for the arc current build-up cannot ensure optimum conditions for cutting. Employment of one, though optimum condition cannot ensure reliable operation of the torch in other than optimum conditions, reducing cutting possibilities.

It is an object of this invention to provide a method of plasma arc control which could ensure optimum cutting conditions for each cutting mode.

Another object of this invention is to provide a device to realize such an optimum method of cutting.

Yet another object of this invention is to reduce the possibility for double arc formation.

A further object of this invention is to improve the reliability of cutting plasma arc control.

A still further object of this invention is to provide a method upgrading the quality of cutting, particularly during the initial period.

It is, therefore, a primary object of this invention to provide such a method for cutting plasma arc control, wherein each cutting condition with a constant gas flow rate is ensured optimum conditions for arc burning, and a device for realizing said method.

These objects are achieved by controlling plasma arc cutting, wherein cutting is done at a certain constant flow rate of the plasma forming gas and the cutting arc supply current is fed in two stages: at first by a jump to the current value amounting to almost half the cutting current and then by gradually increasing the supply current until the cutting current value is achieved. Before the current is supplied it is required, in accordance with this invention, to determine the pressure change characteristics or curve of the plasma forming gas in the torch at a specified flow rate from the moment the gas is fed into the torch until the pressure of the plasma forming gas in the torch reaches the pressure of the supplied gas, the current being gradually increased according to the earlier determined pressure change characteristics or curve until the cutting current value is determined.

The advantages of such a method consist in that optimum conditions of plasma arc burning of any torch are ensured due to the coordinated changes of the electrical current and gas, and any chance of double arc formation or incomplete metal cutting is eliminated. It should be emphasized that such optimum conditions exist both at the initial and further stages of cutting.

It is advisable with this method, before the current is supplied, to feed the plasma forming gas into the torch at a desired flow rate and shut off the outlet jet orifice of the torch instantly and completely. Then the gas pressure in the torch is permanently measured until it equalizes with the pressure of the supplied gas and a curve is thus obtained, which characterizes the pressure change characteristics or curve to be further used for the plasma arc current regulation.

To realize the claimed method there is disclosed a device to control the plasma arc, comprising a power rectifier with a current regulator, connected into the supply circuit of the torch plasma arc, the gas being delivered to the torch through a controllable throttle at a specified flow rate and wherein, according to the invention, the torch is equipped with means for shutting off its outlet jet orifice, and a pressure sensor, featuring an electrical output and producing electrical signals proportional to the changes of pressure in the torch, and the input of the current regulator is connected to a control means including a memory unit coupled by its input to the output of the pressure sensor to register and store its output signals controlling the programme of current build-up in the current regulator.

The invention will now be described with reference to a specific embodiment thereof, taken in conjunction with the accompanying drawings, wherein.

Figure 1:
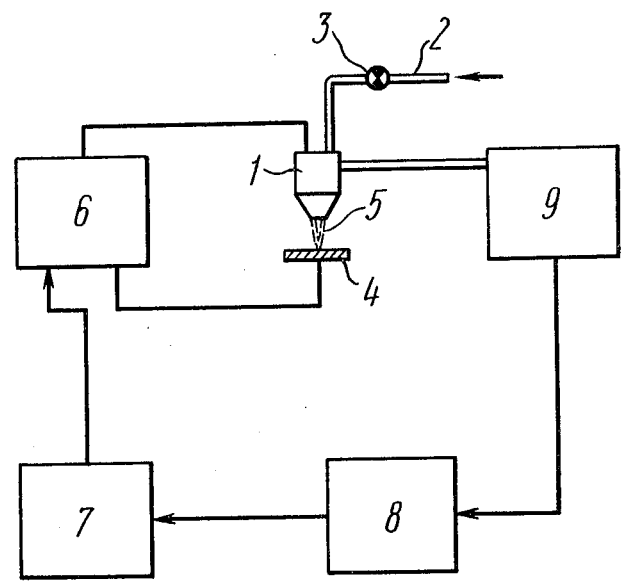
FIG. 1 is a block diagram of a device for plasma arc control employing the principle of the claimed method.

With reference to FIG. 1 there is shown a torch plasma arc control device together with a torch itself designated as 1. A plasma forming gas is fed into the torch 1 through a pipeline 2, wherein an adjusting throttle 3 is secured, which is designed to ensure the desired flow rate of the plasma forming gas supplied to the torch 1. FIG. 1 also shows a metal piece 4 being cut and a plasma arc 5 burning between the torch 1 and the piece 4. There is also a plug provided to stop the outlet orifice of the torch 1 (not shown in FIG. 1 to avoid encumbering), which can be tightly fit into the torch orifice and removed for cutting.

The plasma arc is electrically supplied from a power rectifier 6 featuring an input current regulator. The power rectifier 6 is a thyristor converter controlled by changing the thyristor angle of firing. Such converters are widely employed and are commercially obtainable and need no special description, that is why its key diagram is not supplied. A current regulator 7 comprises a unit for phase-and-pulse control of rectifier thyristors and an input transistor. Regulators of such type are also well known and need no special commentaries.

A means 8 for control of the current regulator 7 is connected into the input circuit of said regulator. This means 8 is meant to control the regulator depending upon the output signals of a pressure sensor, which correspond to specified operating condition. The control means 8 can be made with the use of any available units capable of storing output signals of the pressure sensor and their delivery to the current regulator, when required. Thus the control means 8 comprises a memory unit (not shown) and a matching device (also not shown) to match the memory unit output and the current regulator input.

In one of the embodiments the memory unit comprises recording and reproducing heads and a tape transport mechanism to drive the tape, whereon the information on the sensor output signals are recorded, which characterize the principle of the gas pressure change in the torch. A DC amplifier may be employed as a device for matching the memory unit output and the input of the regulator 7.

Information on the principle of the gas pressure change can be obtained by means of a pressure sensor 9 featuring an electrical output. The pressure sensor 9 is shown outside the gas space of the torch 1, though in reality it is situated inside the torch 1 near the plasma forming gas entrance. A resistance transducer may be employed, which requires no output signal amplification. The sensitive element of this sensor is tightly fixed at the inlet to the gas space of the torch 1.

It is also possible to secure and seal the sensor sensitive element to the butt end of the nozzle at its output jet orifice. In this case the sensor is preferably built tightly in the means for shutting off the orifice so that the pressure sensor sensitive element is situated in the immediate vicinity of the output jet orifice.

Let us discuss the principle of operation of the described device so that the essence of the claimed method becomes clear.

Before the arc is struck, the pressure sensor 9 and the memory unit 8 are switched on. Then the plasma forming gas is delivered to the torch and its initial flow rate is set according to technological requirements for cutting conditions. A certain initial gas pressure sets in within the torch gas space, which is marked on the graph of FIG. 2 by a horizontal line at the level $P_1$. At the moment $t_1$ (FIG. 2) the outlet orifice of the torch 1 is very quickly and completely shut off by a shutter or plug, manually or by means of an electrical gas valve. Now the pressure within the gas chamber of the torch starts to rise until it reaches the final value $P_2$ equal to the pressure of the supply gas or, in other words, to the gas manifold pressure, as shown in FIG. 2 by the curve A.

Figures 2, 3:
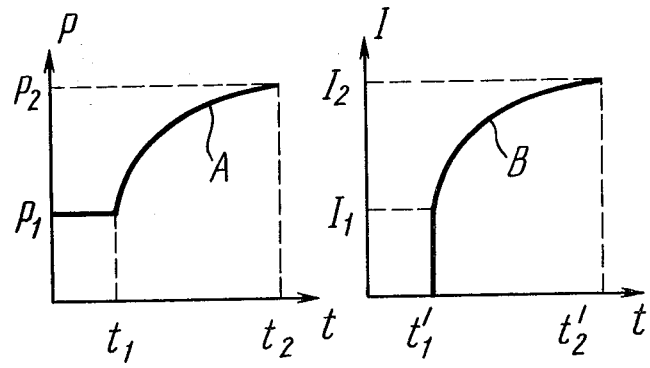
FIG. 2 is a graph depicting the gas pressure changes in the torch, when the outlet jet orifice is instantly shut off.
FIG. 3 is a graph of the plasma arc current changes in accordance with the curve of pressure changes of FIG. 2.

It has been established that optimum cutting conditions can be provided if the arc is supplied by the current in two stages: at first by a jump to the current value amounting to almost half the cutting current value and then by gradually increasing the supply current according to the principle of gas pressure buildup determined as described above and illustrated for a specific example by the curve A in FIG. 2 until it reaches the cutting current value.

That is why electrical signals of the pressure sensor, which characterize the principle of gas pressure change in the indicated period, are fed to the memory unit of the control means 8 to the recording head (not shown), where they are recorded on a ring tape transported to the recording head by means of said tape mechanism.

When the recording is over, the pressure sensor 9 and the recording head are disconnected manually or automatically. Now a part of the tape, whereon the sensor signals has just been recorded as a characteristic of the principle of the pressure change in the torch, is driven to the reproduction head (not shown) by means of the same tape transport mechanism. The device is then ready for current supply to the torch. At the moment t' when the current is fed by a jump, the memory unit reproduction head is automatically switched on and its electrical signals characterizing the curve of gradual arc current build-up (the curve B of FIG. 3 analogous to the curve A of FIG. 2) are passed via the matching device of the memory unit to the input of the adjusting transistor of the current regulator 7 effecting the current build-up by means of phase-and-pulse control of power rectifier thyristors. Thus the duration of the current build-up is equal to the time needed for the pressure in the torch to rise from some initial level $P_1$ to the pressure $P_2$ of the supplied plasma forming gas. When the cutting current value is attained, the tape transport mechanism of the memory unit 8 automatically brings the tape in front of the reproduction head in the initial position, in case multiple plasma arc current build-up is required at this cutting condition.

With different technological requirements to the cutting process, that is when the thickness of the part being cut or the speed of cutting is different, the cutting conditions are altered. The outlet orifice diameter and the initial flow rate of the plasma forming gas set by means of the throttle 3 (FIG. 1) become different. When switching over to a new selected cutting condition, it is required to record the gas pressure curve by means of the forementioned device for each such condition before the current is delivered to the torch and to build up the current in conformity with this curve corresponding to the principle of pressure change.

The proposed method and device for its realization make it possible to eliminate the defect zone, which is formed as a rule at the beginning of the process of cutting, and retain the service life of the torch. Besides, the usually labor consuming adjustment of cutting conditions is drastically reduced, whereas the adjustment accuracy is greatly raised. This helps to increase the current density, while retaining the orifice working capacity, which results in higher cutting speed (by 20–25%) and quality. It should be borne in mind that current build-up principles for various conditions may be determined in advance and selected afterwards, which can make the cutting process automatic.

What is claimed is:

1. A method of controlling a cutting torch for plasma arc cutting, in which the cutting process is carried out at a predetermined, constant flow rate of a plasma-forming gas, characterized by the steps of supplying the plasma-forming gas to the torch at its desired flow rate; instantaneously closing an outlet nozzle opening of the cutting torch; continuously measuring the pressure of the plasma-forming gas and producing a curve describing the pressure characteristics changes as a function of time; and thereafter supplying an electric current for feeding a cutting arc, and wherein said current is supplied in two stages: firstly, said current is supplied as a step or jump to a current value approximately equal to one-half of the desired cutting current value for a particular cutting condition, and, secondly, said current is gradually increased according to the measured pressure change function up to the value of the desired cutting current.

2. A device for torch plasma arc control comprising: an adjustable throttle placed in the plasma forming gas supply manifold connected to the torch to control the flow rate of the gas fed to the torch depending on the particular current condition; means for shutting off the outlet orifices of the torch; a pressure sensor featuring an electrical output producing signals proportional to changes of pressure in the torch and characterizing the pressure change characteristics or curve of the torch; a rectifier, for supplying electrical current, connected into the electrical supply circuit of the arc of the torch; a current regulator of said rectifier coupled to the input of said rectifier; control means having a memory unit connected to the input of said regulator and to the output of said sensor to record and store said signals, said control means producing control signals for the regulator in accordance with the signals accumulated in the memory unit, which makes it possible to effect the gradual current build-up in accordance with the pressure change characteristics or curve of the torch.

* * * * *